US010976810B2

(12) United States Patent
Munegowda et al.

(10) Patent No.: US 10,976,810 B2
(45) Date of Patent: Apr. 13, 2021

(54) SHARING INPUT AND OUTPUT DEVICES IN NETWORKED SYSTEMS

(75) Inventors: Keshava Munegowda, Bangalore (IN); Veeramanikandan Raju, Bangalore (IN); Keerthy J, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 168 days.

(21) Appl. No.: 13/401,356

(22) Filed: Feb. 21, 2012

(65) Prior Publication Data

US 2013/0016202 A1 Jan. 17, 2013

(30) Foreign Application Priority Data

Jul. 11, 2011 (IN) .......................... 2347/CHE/2011

(51) Int. Cl.
*H04N 7/18* (2006.01)
*G06F 3/01* (2006.01)
*H04N 1/00* (2006.01)

(52) U.S. Cl.
CPC ......... *G06F 3/013* (2013.01); *H04N 1/00204* (2013.01); *H04N 1/00381* (2013.01); *H04N 1/00233* (2013.01); *H04N 2201/001* (2013.01); *H04N 2201/0084* (2013.01); *H04N 2201/0091* (2013.01)

(58) Field of Classification Search
CPC . G06F 3/013; H04N 1/00204; H04N 1/00381
USPC .............................. 348/78; 345/156; 709/203
See application file for complete search history.

(56) References Cited

U.S. PATENT DOCUMENTS

| | | | | |
|---|---|---|---|---|
| 6,549,966 B1* | 4/2003 | Dickens | .............. | G06F 13/4022 370/406 |
| 7,331,929 B2* | 2/2008 | Morita | ................. | A61B 5/7475 348/333.03 |
| 7,472,217 B2* | 12/2008 | Lou | ........................... | G06F 3/02 710/316 |
| 8,484,403 B2* | 7/2013 | Wu | ........................ | G06F 3/023 710/316 |
| 9,619,017 B2* | 4/2017 | Samanta Singhar | ... | G06F 3/005 |
| 2002/0059372 A1* | 5/2002 | Goshev et al. | ............... | 709/203 |
| 2003/0067543 A1* | 4/2003 | Okada | .................... | H04N 7/181 348/207.1 |
| 2006/0244724 A1* | 11/2006 | Erickson | ................. | G06F 3/038 345/163 |
| 2007/0067373 A1* | 3/2007 | Higgins | .............. | G06F 11/3013 |
| 2007/0164990 A1* | 7/2007 | Bjorklund et al. | ........... | 345/156 |

(Continued)

*Primary Examiner* — Joon Kwon

(74) *Attorney, Agent, or Firm* — Ebby Abraham; Charles A. Brill; Frank D. Cimino

(57) ABSTRACT

A technique for sharing a peripheral device among a group of systems comprises capturing a set of images of a user, and processing the set of images of the user to determine a user directive to designate a first system in the group as an owner of a peripheral device of a second system in the group. If the peripheral device is an input device, the technique further comprises redirecting, responsive to the user directive, from the second system to the first system, data entered using the input device of the second system. If the peripheral device is an output device, the technique further comprises forwarding, responsive to the user directive, from the first system to the second system, data for processing by the output device of the second system. In an embodiment, the user directive is in the form of the user's eye gaze directed at a camera.

16 Claims, 4 Drawing Sheets

(56) References Cited

U.S. PATENT DOCUMENTS

| | | | | |
|---|---|---|---|---|
| 2008/0024433 A1* | 1/2008 | Gunther | ............. | G06F 3/012 |
| | | | | 345/156 |
| 2009/0210608 A1* | 8/2009 | Chang | ............. | G06F 13/4022 |
| | | | | 710/316 |
| 2010/0049890 A1* | 2/2010 | Best | ............. | G06Q 10/10 |
| | | | | 710/73 |
| 2014/0152538 A1* | 6/2014 | Ham | ............. | G06F 3/012 |
| | | | | 345/156 |
| 2015/0153827 A1* | 6/2015 | Yun | ............. | G06F 3/013 |
| | | | | 345/156 |
| 2017/0364148 A1* | 12/2017 | Kim | ............. | G01C 21/3626 |
| 2018/0032300 A1* | 2/2018 | Singh | ............. | B60K 35/00 |

\* cited by examiner

SHARING INPUT AND OUTPUT DEVICES IN NETWORKED SYSTEMS

RELATED APPLICATION

The present application is related to and claims priority from the co-pending India Patent Application entitled, "SHARING INPUT-OUTPUT DEVICES BASED ON EYE GAZE AND FACE DETECTION", Application Number: 2347/CHE/2011, attorney docket number: TI-70710, Filed: Jul. 11, 2011, naming the same inventors as in the subject patent application, and is incorporated in its entirety herewith.

BACKGROUND

Technical Field

Embodiments of the present disclosure relate generally to networked systems, and more specifically to sharing input and output devices in networked systems.

Related Art

Networked systems generally refer to computing systems interconnected in the form of a network, thereby allowing systems in the network to communicate with each other according to a corresponding protocol. The interconnection of the systems may be achieved via wired, wireless or a combination of wired and wireless paths. Examples of networked systems include systems (e.g., personal computers, mobile phones, personal digital assistants, etc.) interconnected as a local area network (LAN), TCP/IP network, wireless local area network (WLAN), a USB (universal serial bus) network, BLUETOOTH network, etc.

An input device refers to a device used for providing user inputs to a system. Examples of an input device include keyboard, mouse, etc. An output device refers to a device for rendering data from a system usually in human-understandable form. Examples of an output device include monitor, printer, etc. As used herein the term input/output (I/O) device (or peripheral device) will be used to refer to an input device, an output device or both. There is often a need to share an I/O device among systems of a network. An example scenario is when only one system in the network is provided with an I/O device, while other systems in the network are not. Another example scenario is when the I/O device of a system (A) is not very user-friendly, and it would be more convenient to use the I/O device of another system (B) in the network to operate as if it were an I/O device of (or directly connected to) system (A).

SUMMARY

This Summary is provided to comply with 37 C.F.R. § 1.73, requiring a summary of the invention briefly indicating the nature and substance of the invention. It is submitted with the understanding that it will not be used to interpret or limit the scope or meaning of the claims.

A method of sharing a peripheral device among a group of systems comprises capturing a set of (one or more) images of a user, and processing the set of images of the user to determine a user directive to designate a first system in the group as an owner of a peripheral device of a second system in the group. If the peripheral device is an input device, the method further comprises redirecting, responsive to the user directive, from the second system to the first system, data entered using the input device of the second system. If the peripheral device is an output device, the method further comprises forwarding, responsive to the user directive, from the first system to the second system, data for processing by the output device of the second system.

Several embodiments of the present disclosure are described below with reference to examples for illustration. It should be understood that numerous specific details, relationships, and methods are set forth to provide a full understanding of the embodiments. One skilled in the relevant art, however, will readily recognize that the techniques can be practiced without one or more of the specific details, or with other methods, etc.

BRIEF DESCRIPTION OF THE VIEWS OF DRAWINGS

Example embodiments will be described with reference to the accompanying drawings briefly described below.

The drawing in which an element first appears is indicated by the leftmost digit(s) in the corresponding reference number.

DETAILED DESCRIPTION

Various embodiments are described below with several examples for illustration.

1. Example Environment

Figure 1:
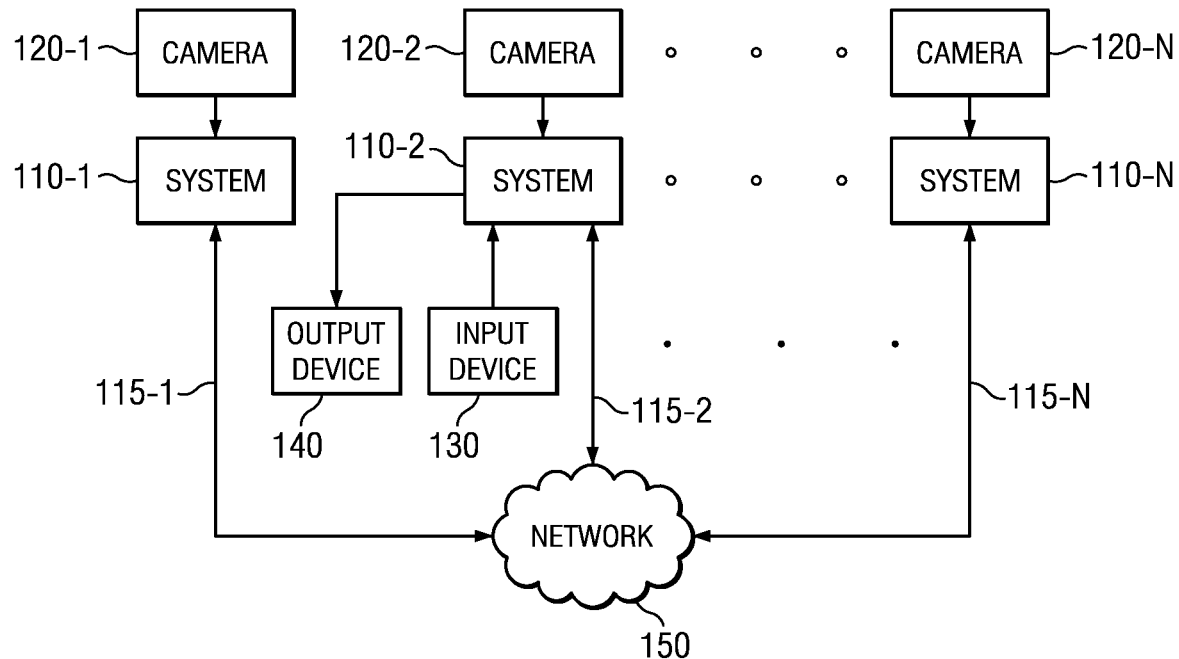
FIG. 1 is a diagram illustrating an example environment in which several embodiments can be implemented.

FIG. 1 is a diagram illustrating an example environment in which several embodiments can be implemented. FIG. 1 is shown containing computing systems (systems) 110-1 through 110-N, cameras 120-1 through 129-N, input device 130, output device 140 and network 150. The components and systems of FIG. 1 are shown merely by way of illustration, and other environments may contain more or fewer numbers as well as other types of systems/components.

Each of systems 110-1 through 110-N is connected to a corresponding camera (image capture device, in general) 120-1 through 120-N respectively. In the environment of FIG. 1, merely for illustration, it is assumed that only system 110-2 has its own input and output devices, shown numbered 130 and 140 respectively. Input device 130 could, for example, represent a keyboard, and is connected to system 110-2 via a conventional keyboard interface, well-known in the relevant arts. Output device, could for example, represent a printer, and is connected to system 110-2 via a conventional printer interface, also well known in the relevant arts.

Cameras 120-1 through 120-N operate as image capture devices, and provide captured images to systems 110-1 through 110-N respectively for processing. The mechanism of image capture used in each of cameras 120-1 through 120-N could be one of several well-known techniques, such as using those employing charge-coupled devices (CCD) sensors, CMOS sensors etc. Each of systems 110-1 through 110-N includes a corresponding image processing software for processing the images generated by the corresponding camera as desired, and as described with respect to embodiments below.

Network 150 represents a mechanism for interconnecting systems 110-1 through 110-N, thereby allowing systems 110-1 through 110-N to communicate with each other. Network 150 may be implemented in according one of several well-known techniques, such as, for example, Local area network (LAN), wireless LAN (WLAN), USB network, serial port network, TCP/IP network, etc, as also noted above. In addition to enabling systems 110-1 through 110-N to communicate with each other, network 150 also enables sharing of input device 130 and output device 140 among systems 110-1 through 110-N, even though input device 130 and output device 140 are each directly connected to (i.e., owned by) system 110-2.

The term "owner" of an input device, as used herein means, a system that is the target (end destination) of the data generated by the input device. Thus, a user-level application executing in the "owner" system will receive the data generated by the input device. Similarly, the term "owner" of an output device, as used herein, means that data generated by the "owner" (typically, a user-level application executing in the "owner") is transmitted to the output device for outputting (e.g., printing in case of a printer and rendering in case of a display unit). Thus, with respect to FIG. 1, system 110-2 is the default owner of input device 130 and output device 140. Other systems of FIG. 1 could become owners of input device 130 and output device 140 based on several operations, as described next.

2. Device Sharing

Figure 2:
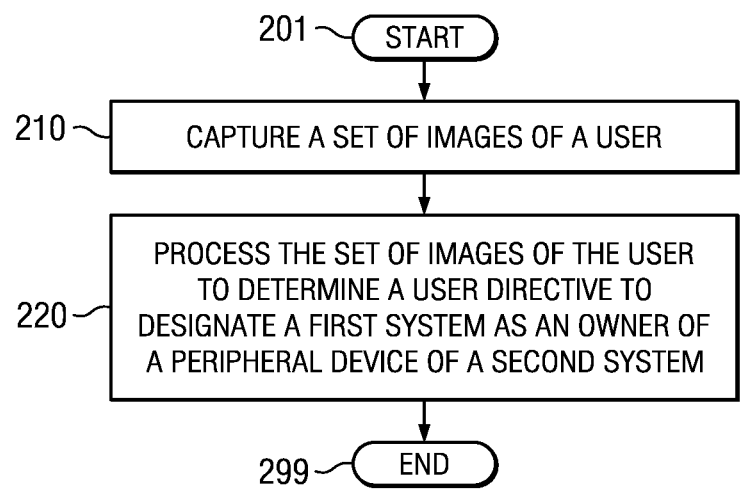
FIG. 2 is a flowchart illustrating the manner in which an I/O device can be shared among systems of a network, in an embodiment.

FIG. 2 is a flowchart illustrating the manner in which an I/O device can be shared among systems of a network, in an embodiment. The flowchart is described with respect to the blocks of FIG. 1 merely for illustration. However, many of the features can be implemented in other environments also without departing from the scope and spirit of several aspects of the present invention, as will be apparent to one skilled in the relevant arts by reading the disclosure provided herein. The flow chart begins in step 201, in which control immediately passes to step 210.

In step 210, each of cameras 120-1 through 120-N captures a corresponding set of images of a user. Each of cameras 120-1 through 120-N forwards data representing the corresponding set of images to systems 110-1 through 110-N respectively. Control then passes to step 220.

In step 220, each of systems 110-1 through 110-N processes the corresponding set of images of the user to determine a user directive to designate a first system as an owner of a peripheral device of a second system. The processing generally needs to be consistent with an understanding of the user actions that constitute a corresponding directive. Control then passes to step 299, in which the flowchart ends.

In an embodiment, the user directive of step 220 is the eye gaze of a user. A user or an operator of systems 110-1 through 110-N gazing directly at a camera 'A' (one of cameras 120-1 through 120-N) is deemed to be a user command to designate the system corresponding to camera 'A' as the owner of input device 130 and output device 140. Thus, for example, assuming the user's gaze is directed straight at camera 120-1 (or more precisely at the lens of camera 120-1), then system 110-1 is deemed to have been designated as the user of input device 130 and output device 140.

Thus, any user inputs provided via input device 130 (e.g., keyboard) would be routed (via system 110-2 and network 150) to system 110-1 for action by a corresponding user application in system 110-1. The user inputs would not affect the state of system 110-2, and thus user applications in system 110-2 would not receive the user inputs. Outputs of system 110-1 would be forwarded (network 150 and system 110-2) to output device 140 for rendering. Assuming output device 140 to be a printer, output data from system 110-1 would be sent to the printer for printing.

Thus, in response to a user directive indicated by a user eye gaze directed at a camera of a first system, data generated by input device 130 is redirected from system 110-2 to the first system. Also, in response to the user directive, output data generated by the first system is forwarded from the first system to system 110-2 and thence to output device 140 for further processing and/or rendering.

Each of systems 110-1 through 110-N is deployed with image processing software that is designed to detect eye gaze of a user. The image processing software may be designed and implemented in a known way. Alternatively, one of several well-known commercially available eye gaze recognition software/solutions may be used.

The physical distribution or placement of systems 110-1 through 110-N (and therefore of cameras 120-1 through 120-N), and corresponding precision/accuracy of the image processing software ensures that only one system among systems 110-1 through 110-N can possibly conclude that the user's eye gaze is directed at the corresponding camera. While user eye gaze is noted above as being indicative of a user directive to 'assign' ownership of I/O devices in a network, other expressions or gestures of a user can also be used instead as indications of the user directive.

Figure 3:
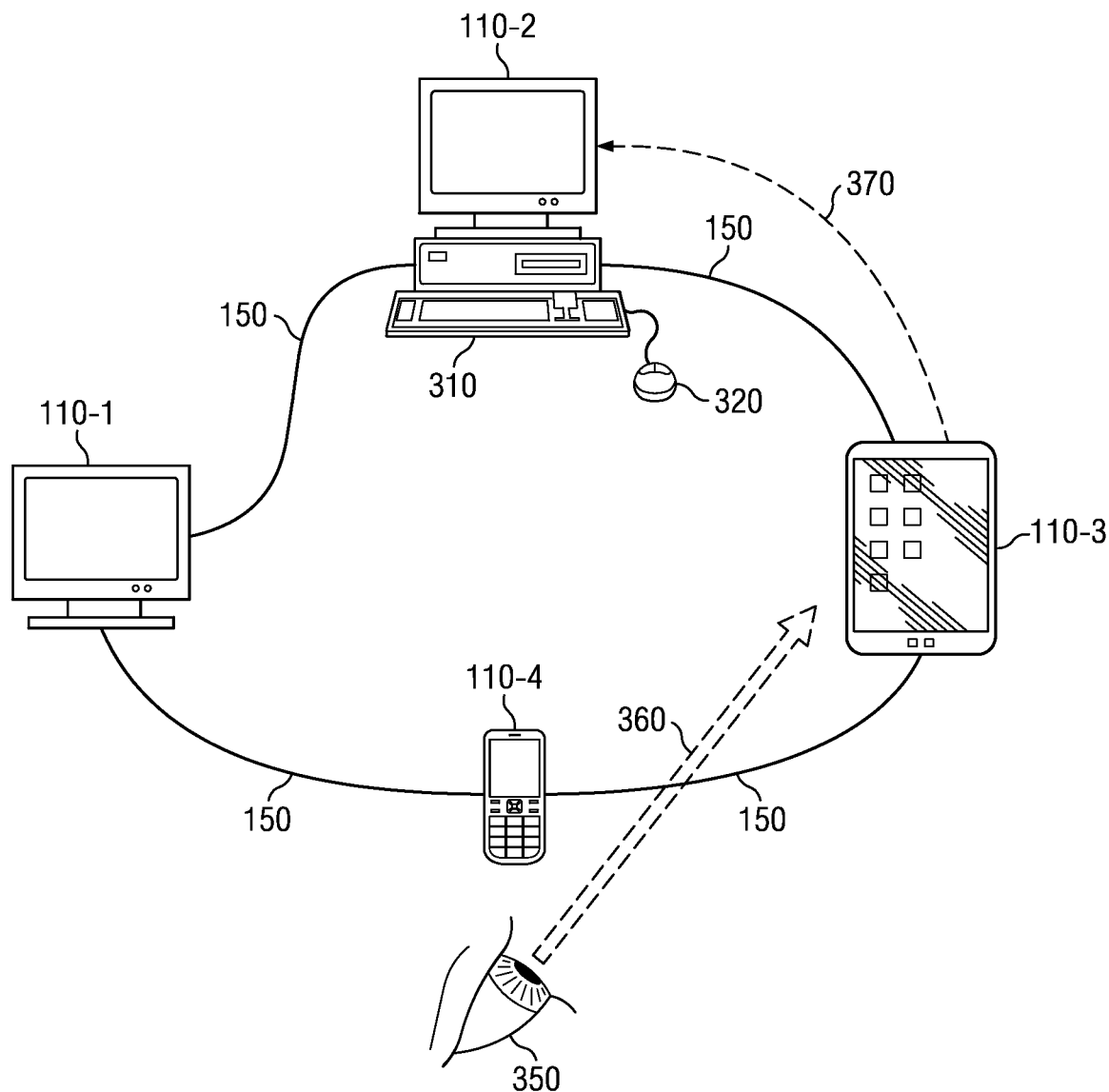
FIG. 3 is a diagram illustrating an example technique by which a user provides a directive to designate a system as an owner of a peripheral device of another system.

FIG. 3 shows a user gaze 'directed' (indicated by lines 360) at (the camera, not shown, of) system 110-3, shown in FIG. 3 as a personal digital assistant which may have a keypad and display. User's eye is shown designated by number 350. System 110-2 is shown as a desktop personal computer (PC) with its own input and output devices (keyboard 310, mouse 320 and monitor). System 110-1 is shown as a desktop personal computer (PC) with its own output device (monitor), but no input devices. System 110-4 is shown as being a mobile phone, and may contain a keypad and display. Network 150 is indicated by curved lines numbered 150.

Using the input devices (keypads) of systems 110-3 and 110-4 may not be user-friendly, and a user may, for example, wish instead to use keyboard 310 to input data to system 110-3. In the scenario of FIG. 3, it is assumed for the purpose of illustration that it is desired to share keyboard 210 of system 110-2 among all of systems 110-1, 110-2, 110-3 and 110-4. When the user's eye gaze is directed at system 110-3 (or the camera, not shown, of system 110-3), corresponding image processing software in system 110-3 determines that the user wishes to use keyboard 310 to input data to system 110-3. It may be appreciated that, the image processing software in systems 110-1, 110-2 and 110-4 do not make such a determination since the user's gaze is directed at system 110-3.

In response to the user directive, as determined by the image processing software in system 110-3, system 110-3 sends a request (denoted in FIG. 3 by arrow 370) to system 110-2 to redirect (to system 110-3) data entered using keyboard 310. Accordingly, system 110-2 redirects data received from keyboard 310 to system 110-3. User-level applications executing in system 110-3 may then use or process the data thus received appropriately. User-level applications executing in system 110-2 do not receive the data. Thus, keyboard 310 is enabled to 'operate' as if it were 'owned' by system 110-3. An output device (e.g., a printer) may similarly be shared among systems 110-1 through 110-4.

The interactions among various internal blocks/modules of a pair of systems in sharing an I/O device are illustrated next, with respect to an example embodiment.

3. Example Embodiment

Figure 4:
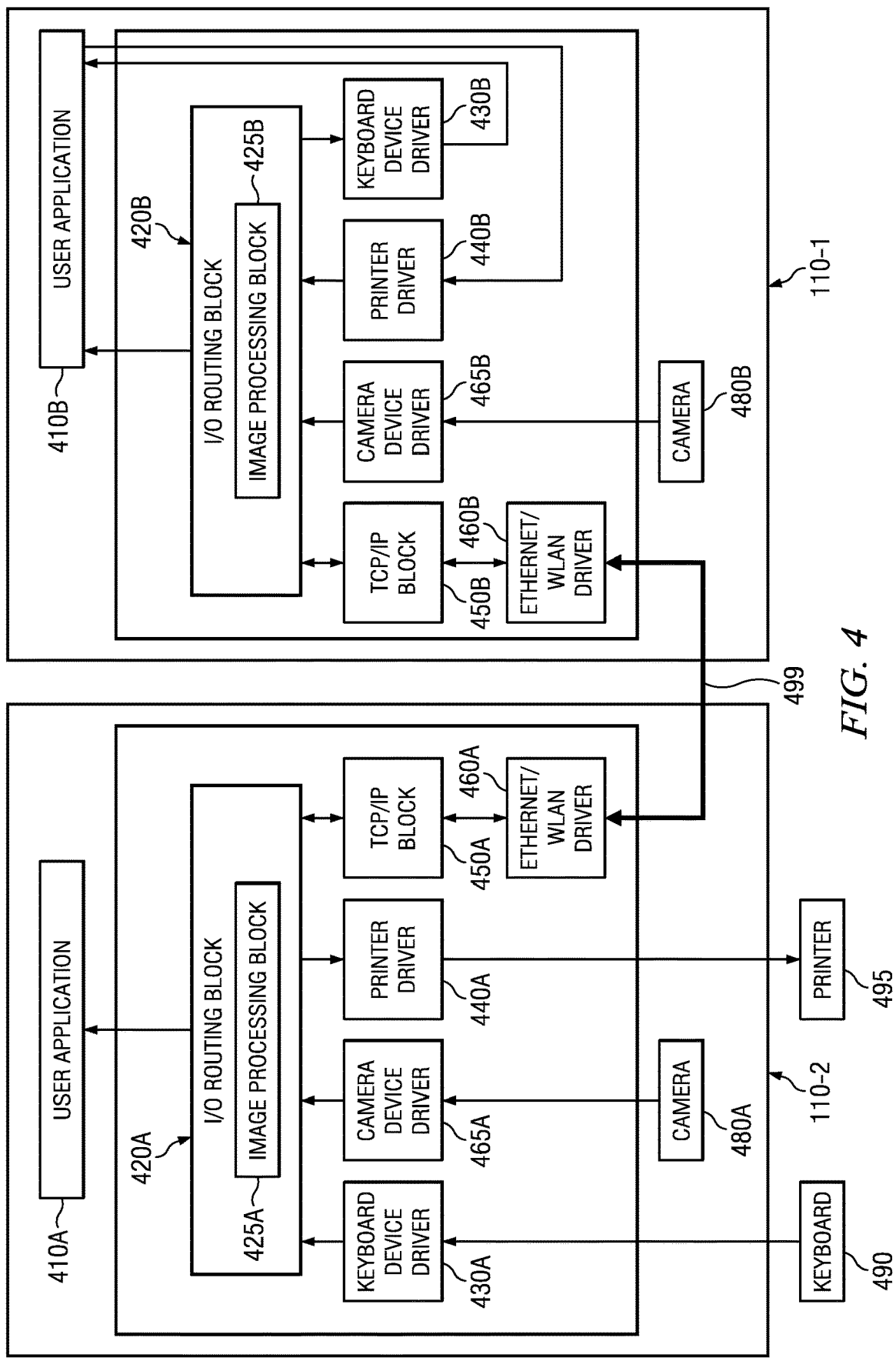
FIG. 4 is a diagram illustrating some of the internal blocks and their interactions in a pair of systems in sharing an I/O device, in an embodiment.

FIG. 4 is a diagram illustrating some of the internal blocks and their interactions in a pair of systems in sharing an I/O device, in an embodiment. It is assumed in the following description that system 110-2 has its own input device (e.g., keyboard) and output device (e.g., printer), while system 110-1 does not have any I/O device directly connected to it. Further, it is assumed merely for illustration that the network connecting systems 110-1 and 110-2 is a TCP/IP network. In other embodiments, the specific type of network may be different.

System 110-2 is shown containing blocks 410A, 420A, 430A, 440A, 450A, 460A, 465A and camera 480A. Keyboard 490 and printer 495 respectively represent an input device and an output device connected to system 110-2, i.e., the default "owner" of keyboard 490 and printer 495 is system 110-2.

Keyboard device driver 430A receives data entered on keyboard 490 by a user, and forwards the data using corresponding format/protocol to I/O routing block 420A. Camera device driver 465A receives images captured by camera 480A, and forwards the images in a corresponding format to I/O routing block 420A. Printer driver 440A receives data from I/O routing block 420A to be printed by printer 495, and forwards the data to printer 495 in a corresponding format. Printer driver 440 may also enable configuration of printer 495.

TCP/IP block 450A performs the network layer operations required to transmit data from and receive data in system 110-2. Thus, for example, TCP/IP block 450A may receive, via I/O routing block 420A, data generated by user application 410A, then form corresponding data packets according to a format specified by the internet protocol, and forward the packets to ether net/WLAN driver 460A. TCP/IP block 450A may receive data packets formatted as IP (internet protocol) packets from Ethernet/WLAN driver 460A, extract data from the packets, and forward the data to I/O routing block 420A.

Ethernet/WLAN driver 460 performs the data link layer operations required to transmit data from and receive data in system 110-2. Depending on whether network path 499 is a wired path or a wireless path (i.e., depending on whether network 150 of FIG. 1 is a wired or a wireless network), ethernet/WLAN driver 460 may be designed to operate correspondingly. Thus, driver 460 may be designed to be an ethernet driver if network 150 is a wired network (e.g., wired LAN), and a WLAN driver if network 150 is a wireless (e.g., WLAN) network.

User application 410A represents an application that executes on system 110-2 to provide corresponding features. I/O routing block 420A serves as an interface layer between user applications (such as 410A) executing on system 110-2 on one side and blocks 430A, 440A, 450A and 465A on the other. I/O routing block 420A selectively routes data received from keyboard device driver 430 to either user application 410A or TCP/IP block 450A, based on which system (110-1 or 110-2) is to 'own' keyboard 490, as described below. Similarly, I/O routing block 420 receives data from user application 410A for printing, and forwards the data to printer driver 440A. I/O routing block 420A may also receive data for printing from system 110-1 via TCP/IP block 450A and ethernet/WLAN driver 460A, and forward the data to printer driver 440A.

I/O routing block 420A is shown containing image processing block 425A. Image processing block 425A receives images of a user from camera 480A via camera driver 465A, and processes the images to determine a user directive to designate system 110-2 as the owner of keyboard 490 and printer 495. It may be appreciated that system 110-2 is the default owner of keyboard 490 and printer 495. However, system 110-1 may be designated as the owner of keyboard 490 and printer 495 based on a corresponding user directive provided via camera 480B of system 110-1. Change of the ownership back to system 110-2 is based on the processing by image processing block 425A.

System 110-1 is shown containing blocks 410B, 420B, 430B, 440B, 450B, 460B, 465B and camera 480B.

TCP/IP block 450B, ethernet/WLAN driver 460B, and camera device driver 465B operate in a manner similar to TCP/IP block 450A, ethernet/WLAN driver 460A, and camera device driver 465A of system 110-2, and their description is not repeated here in the interest of conciseness.

I/O routing block 420B and image processing block 425B are each designed to operate similar I/O routing block 420A and image processing block 425A, described above. Although image processing blocks 425A and 425B are respectively noted as being contained within I/O routing blocks 420A and 420B, in other embodiments, image processing blocks 425A and 425B can be implemented external to I/O routing blocks 420A and 420B. In an embodiment, each of image processing blocks 425A and 425B is designed to determine if a user's eye gaze is directed toward a corresponding camera (cameras 480A and 480B respectively). Image processing blocks 425A and 425B can be designed and implemented in a known way. Alternatively, one of several well-known commercially available eye gaze recognition software/solutions may be used.

Keyboard device driver 430B receives (via I/O routing blocks 420B and 420A, and blocks 450A, 460A, 450B and 460B) data entered on keyboard 490 by a user, and forwards the data using corresponding format/protocol to user application 410B. Routing of keyboard-generated data to keyboard device driver 430B assumes that system 110-1 has been designated as the owner of keyboard 490. Printer driver 440B receives data to be printed by printer 495 from user application 410B, and forwards the data to I/O routing block 420B. I/O routing block 420B, in turn, forwards the data to I/O routing block 425A via blocks 450B, 460B, 460A and 450B. I/O block 420A then forwards the data to printer 495 via printer driver 440A.

In operation, when a user of systems 110-1 and 110-2 wishes to assign ownership of either keyboard 490 or printer 495 or both to system 110-1, then a user designation (e.g., user gazes directly at camera 480B) is conveyed via camera 480B to image processing block 425B, which processes a set of images of the user to determine indication of user designation. Image processing block 425B then informs I/O routing block 420B of the 'change' in ownership of keyboard 490 and printer 495. I/O routing block 420B, in turn, informs (via blocks 450B, 460B, 460A and 450A) I/O routing block 420A of the change in ownership. Subsequently, all data entered using keyboard 490 are routed by I/O routing block 420A to I/O routing block 420B, which in turn forwards the data to user application 410B via keyboard device driver 430B. Thus, the user can use keyboard 490 as if keyboard 490 were directly connected to system 110-1.

In a similar manner, once ownership of printer 495 is assigned to system 110-1, data (generated by user application 410B) to be printed is routed to printer 495 via the corresponding blocks of system 110-1 and 110-2. Ownership of keyboard 490 and printer 495 can be transferred back to system 110-2 subsequently, by a corresponding user gesture (e.g., eye gaze directed at camera 480A).

Variations of the techniques described above are also possible. For example, based on a specific user-gesture, a user can selectively assign (or change) ownership of keyboard 490 and printer 495. For example, based on a pre-arranged gesture (which image processing blocks 425A and 425B are designed to be able to recognize), a user can assign ownership of keyboard 490 to one of systems 110-1 and 110-2 while assigning ownership of printer 495 to the other one of systems 110-1 and 110-2.

The description is continued with respect to a digital processing system in which various features are operative when the corresponding executable modules are executed.

4. Digital Processing System

Figure 5:
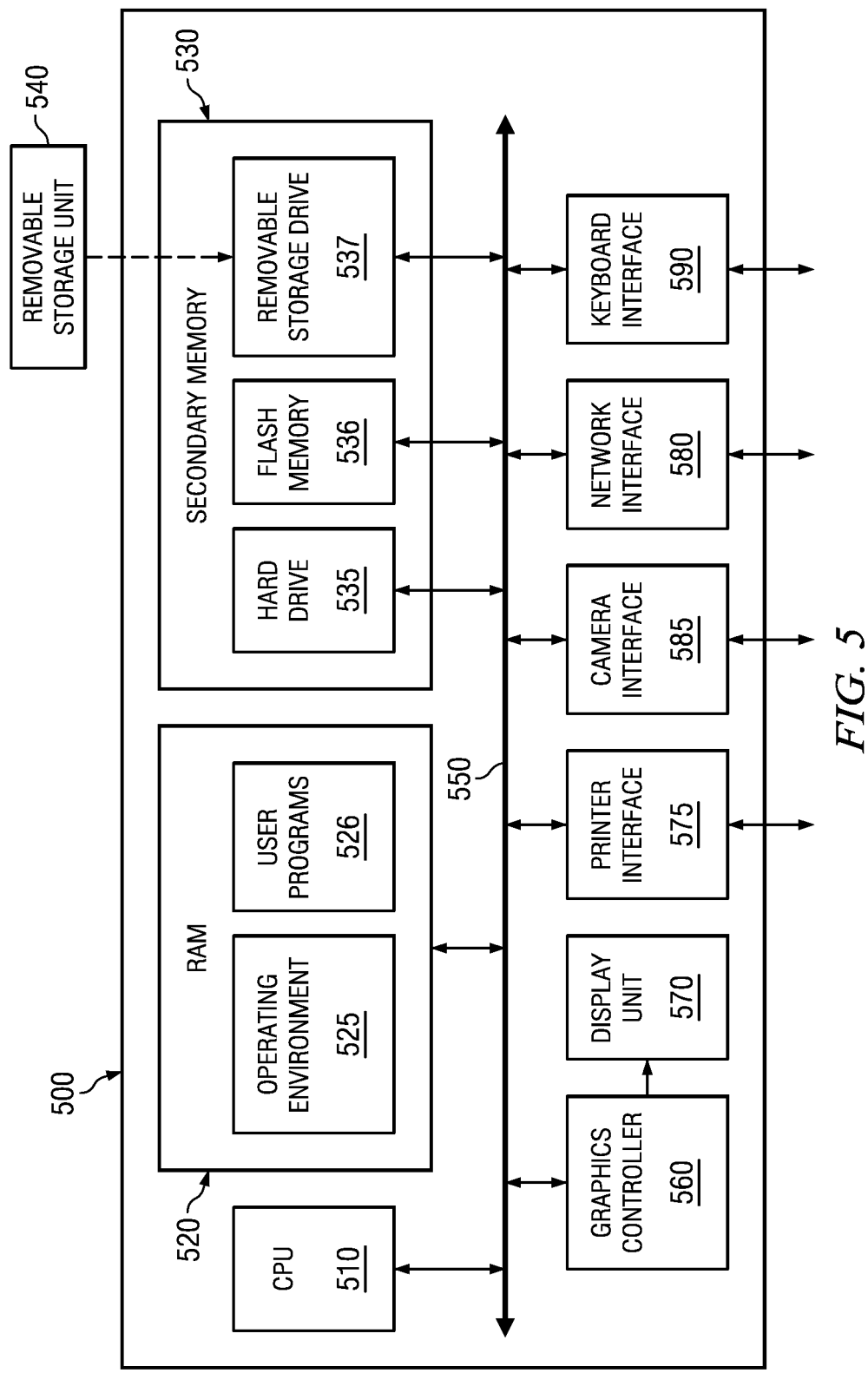
FIG. 5 is a block diagram illustrating the details of a digital processing system.

FIG. 5 is a block diagram illustrating the details of digital processing system 500. Digital processing system 500 can correspond to any of systems 110-1 through 110-N, with corresponding modifications. For ease of description, it is assumed in the following description that digital processing system represents system 110-2. Digital processing system 500 may contain one or more processors (such as a central processing unit (CPU) 510), random access memory (RAM) 520, secondary memory 530, graphics controller 560, display unit 570, printer interface 575, network interface 580, camera interface 585 and keyboard interface 590. All the components except display unit 570 may communicate with each other over communication path 550, which may contain several buses, as is well known in the relevant arts.

CPU 510 may execute instructions stored in RAM 520. CPU 510 may contain multiple processing units, with each processing unit potentially being designed for a specific task. Alternatively, CPU 510 may contain only a single general-purpose processing unit. The instructions executed by CPU 510 include those represented by modules/blocks 420A, 425A, 430A, 440A, 450A, 460A and 465A of FIG. 4.

RAM 520 may receive instructions from secondary memory 530 using communication path 550. RAM 520 is shown 'currently' containing software instructions constituting shared environment 525 and/or user programs 526. Operating environment 525 contains utilities shared by user programs, and such shared utilities include operating system, virtual machines, etc., which provide a (common) run-time environment for execution of user programs/applications (including user application 410A of FIG. 4).

Graphics controller 560 generates display signals (e.g., in RGB format) to display unit 570 based on data/instructions received from CPU 510. Display unit 570 contains a display screen to display the images defined by the display signals. Printer interface 575 provides the electrical and logical interfaces to enable CPU 510 to send data for printing to a printer (not shown) connected to printer interface 575.

Camera interface 585 provides the electrical and logical interfaces to enable CPU 510 to control and receive images captured by a camera (not shown) connected to camera interface 585. Network interface 580 provides the physical, electrical and protocol implementations that enable system 500 to communicate with other systems using protocols such as TCP/IP. Keyboard interface 590 provides the electrical and logical interfaces to enable CPU 510 to receive data entered using a keyboard (not shown) connected to keyboard interface 590.

Secondary memory 530 (representing a non-transitory storage/medium) may contain hard drive 535, flash memory 536, and removable storage drive 537. Secondary memory 530 may store data and software instructions.

Some or all of the data and instructions may be provided on removable storage unit 540, and the data and instructions may be read and provided by removable storage drive 537 to CPU 510. Floppy drive, magnetic tape drive, CD-ROM drive, DVD Drive, Flash memory, removable memory chip (PCMCIA Card, EPROM) are examples of such removable storage drive 537.

Removable storage unit 540 may be implemented using medium and storage format compatible with removable storage drive 537 such that removable storage drive 537 can read the data and instructions. Thus, removable storage unit 540 includes a computer readable storage medium having stored therein computer software and/or data. However, the computer (or machine, in general) readable storage medium can be in other forms (e.g., non-removable, random access, etc.).

In this document, the term "computer program product" is used to generally refer to secondary memory 530. These computer program products are means for providing software to digital processing system 500. CPU 510 may retrieve the software instructions, and execute the instructions to provide various features described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A method comprising:
receiving, by a first input-output routing block of a first computing system from a second input-output routing block of a second computing system, a first user directive of a user, the first computing system is adapted to be coupled to an input device;
receiving, by the first input-output routing block of the first computing system from a third input-output routing block of a third computing system, a second user directive of the user;

determining, by the first computing system, an ownership of the input device based on the received first user directive and the second user directive;
receiving, by the first input-output routing block of the first computing system from the input device, input data;
sending, to the third input-output routing block of the third computing system from the first input-output routing block of the first computing system, the input data in response to determining that the ownership of the input device is the third computing system.

2. The method of claim 1, wherein the third computing device is not directly coupled to the input device.

3. The method of claim 1, further comprising:
receiving, by the first input-output routing block of the first computing system from the second input-output routing block of the second computing system, a third user directive of a user;
receiving, by the first input-output routing block of the first computing system from the third input-output routing block of the third computing system, a fourth user directive of the user;
determining, by the first computing system, the ownership of the input device based on the received third and fourth user directive;
receiving, by the first input-output routing block of the first computing system from the input device, third input data;
sending, to the second input-output routing block of the second computing system from the first input-output routing block of the first computing system, the input data in response to determining that the ownership of the input device is the second computing system.

4. The method of claim 1, wherein the second computing system is a desktop computer and the third computing system is a mobile phone.

5. A device comprising:
a first computing system including a processor, a first input-output routing block, and a machine readable medium coupled to the processor, the first computing system is adapted to be coupled to an input device; and
the machine readable medium storing instructions that, when executed by the processor, cause the computing device to:
receive, from a second input-output routing block of the second computing system, a first user directive of a user;
receive, from a third input-output routing block of the third computing system, a second user directive of the user;
determine an ownership of the input device based on the received first user directive and the second user directive;
receive, from the input device, input data;
send, to the third input-output routing block of the third computing system, the input data in response to determining that the ownership of the input device is the third computing system.

6. The device of claim 5, wherein the third computing device is not directly coupled to the input device.

7. The device of claim 5, wherein the machine readable medium storing instructions that, when executed by the processor, further cause the computing device to:
receive, from the second input-output routing block of the second computing system, a third user directive of a user;
receive, from the third input-output routing block of the second computing system, a fourth user directive of the user;
determine the ownership of the input device based on the received third and fourth user directive;
receive, from the input device, third input data;
send, to the second input-output routing block of the second computing system, the input data in response to determining that the ownership of the input device is the second computing system.

8. The second system of claim 5, wherein the second computing system is a desktop computer and the third computing system is a mobile phone.

9. The method of claim 1, further comprising:
blocking, by the first input-output routing block in the first computing system, a user-level application on the first computing system from receiving the input data in response to determining that the ownership of the input device is the third computing system.

10. The device of claim 5, wherein the machine readable medium storing instructions that, when executed by the processor, further cause the computing device to:
block, by the input-output routing block in the first computing system, a user-level application on the first computing system from receiving the input data in response to determining that the ownership of the input device is the third computing system.

11. The method of claim 1, wherein the first user directive is indicative of a second gesture of the user to the second computing system and the second user directive is indicative of a third gesture of the user to the third computing system.

12. The device of claim 5, wherein the first user directive is indicative of a second gesture of the user to the second computing system and the second user directive is indicative of a third gesture of the user to the third computing system.

13. The method of claim 1, wherein the first computing device is adapted to be coupled to an output device and the gesture is a second gesture; and further comprising:
determining, by the first computing system, an ownership of the output device based on the received first user directive and the second user directive, wherein a third gesture of the user is directed toward the second computing system;
receiving, by the first input-output routing block of the first computing system from the second computing system, output data; and
sending, by the first input-output routing block of the first computing system to the output device, the output data in response to determining that the ownership of the output device is the second computing system.

14. The device of claim 5, wherein the first computing device is adapted to be coupled to an output device and the gesture is a second gesture; and
the machine readable medium storing instructions that, when executed by the processor, further cause the computing device to:
determine an ownership of the output device based on the received first user directive and the second user directive, wherein a third gesture of the user is directed toward the second computing system;
receive output data from the second input-output routing block of the second computing system; and
send the output data to the output device in response to determining that the ownership of the output device is the second computing system.

15. The method of claim 1, wherein the first computing system is adapted to be coupled to an output device; and further comprising blocking, by the first input-output routing block in the first computing system, the output device from receiving the input data in response to determining that the ownership of the output device is the third computing system.

16. The device of claim 5, wherein:

the first computing system is adapted to be coupled to an output device; and the machine readable medium storing instructions that, when executed by the processor, further cause the computing device block, by the first input-output routing block in the first computing system, the output device from receiving the input data in response to determining that the ownership of the input device is the third computing system.

\* \* \* \* \*